Patented Nov. 21, 1933

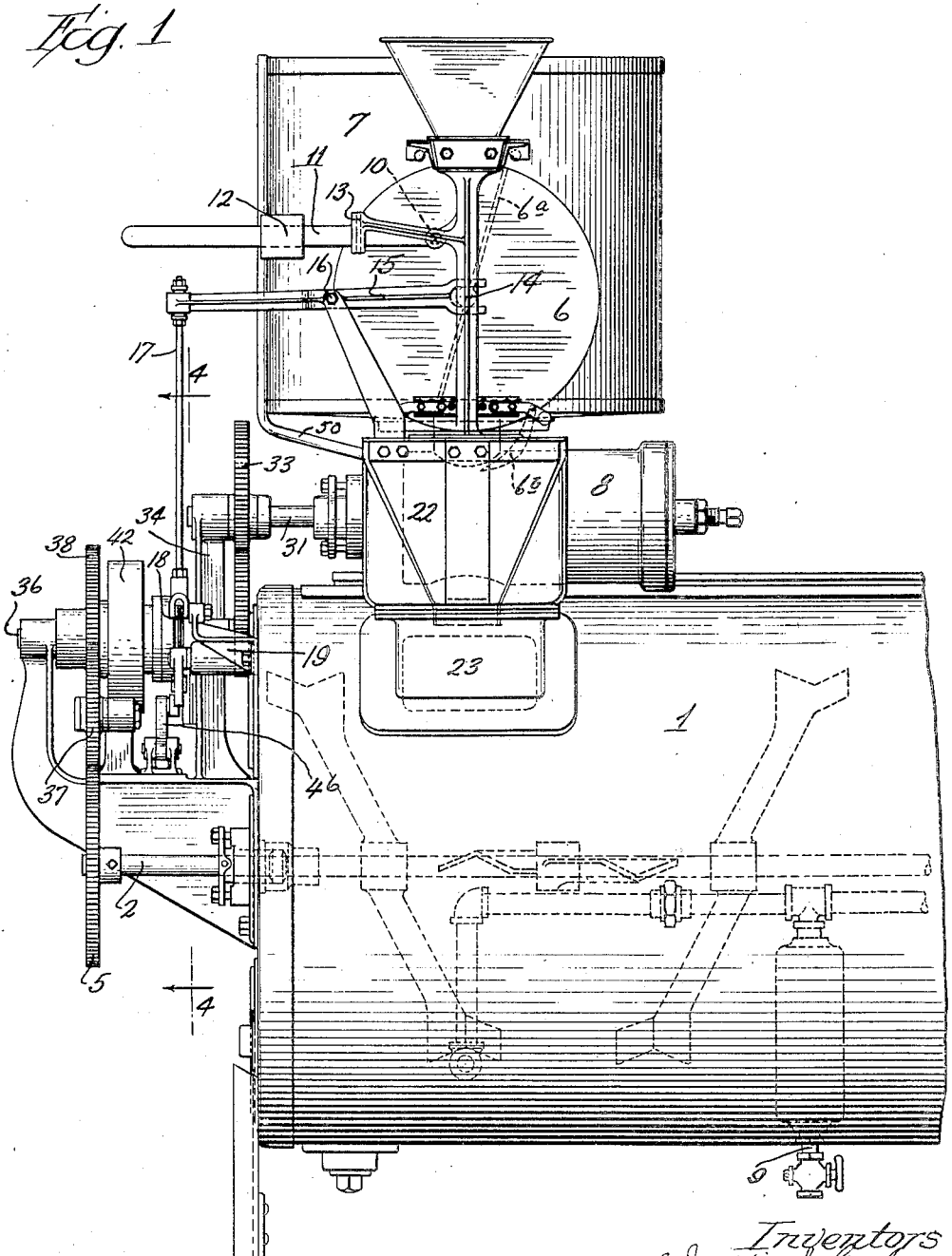

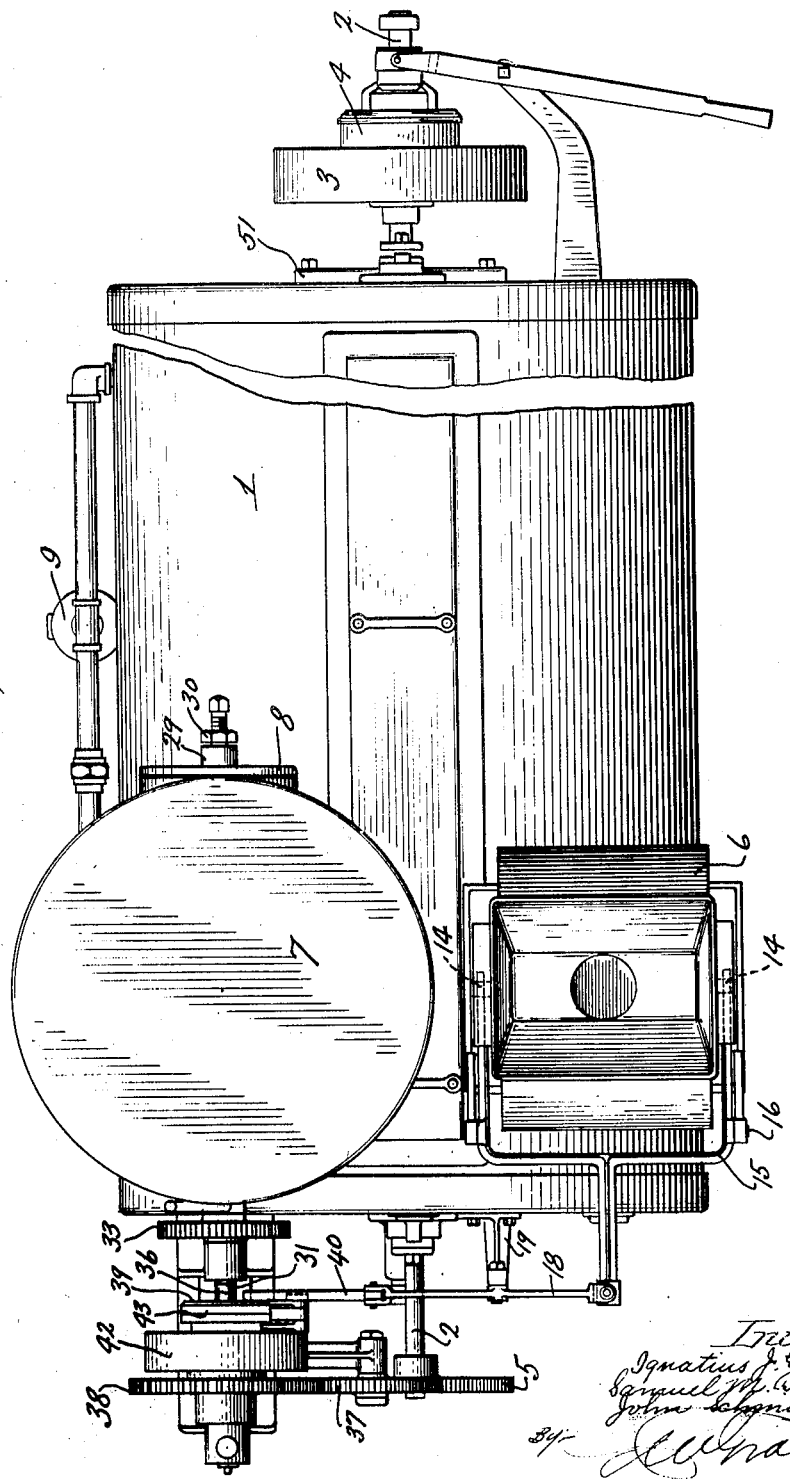

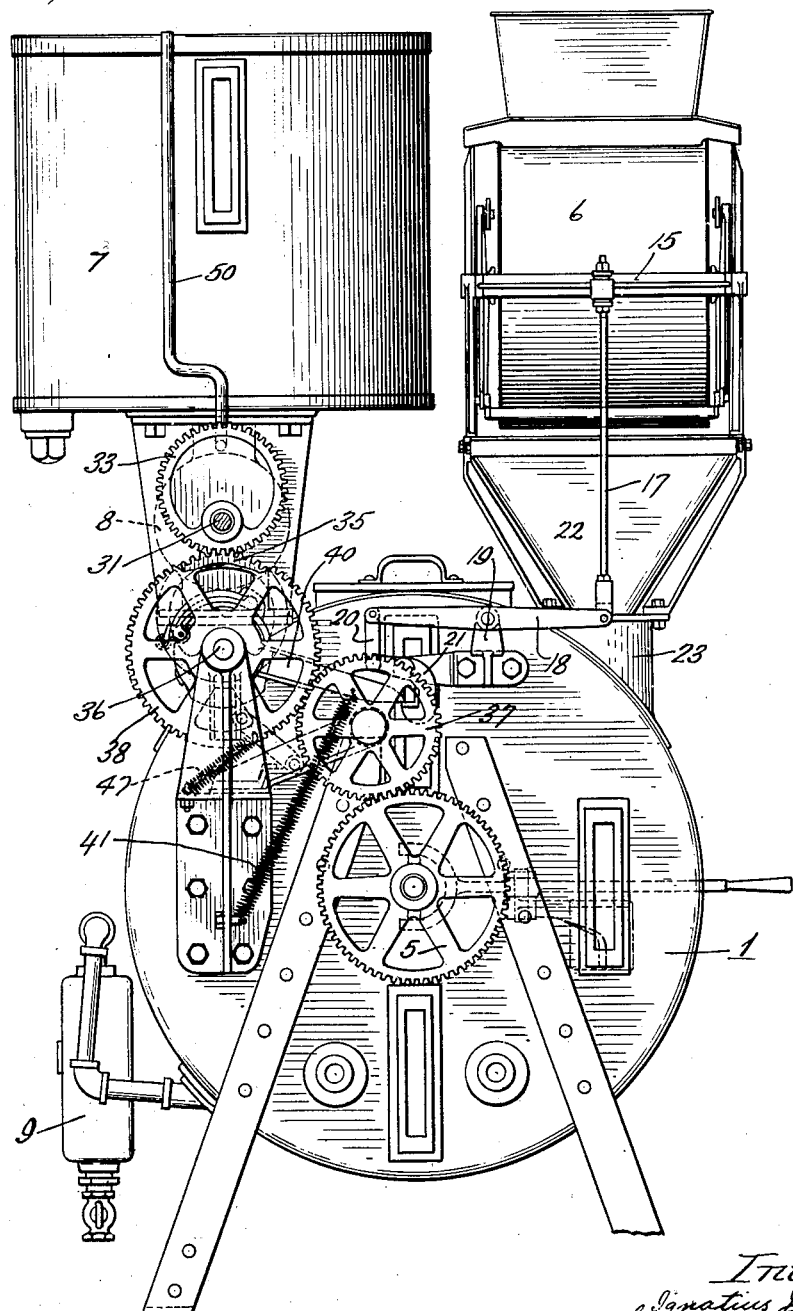

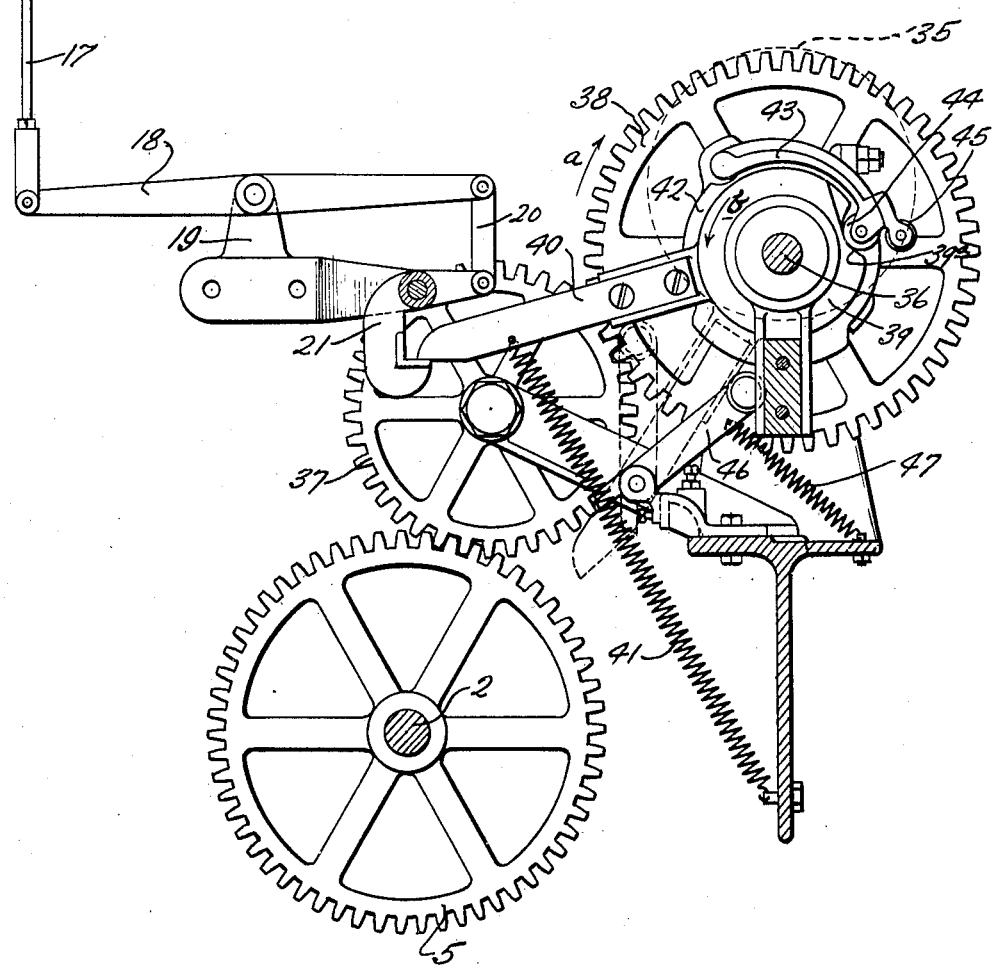

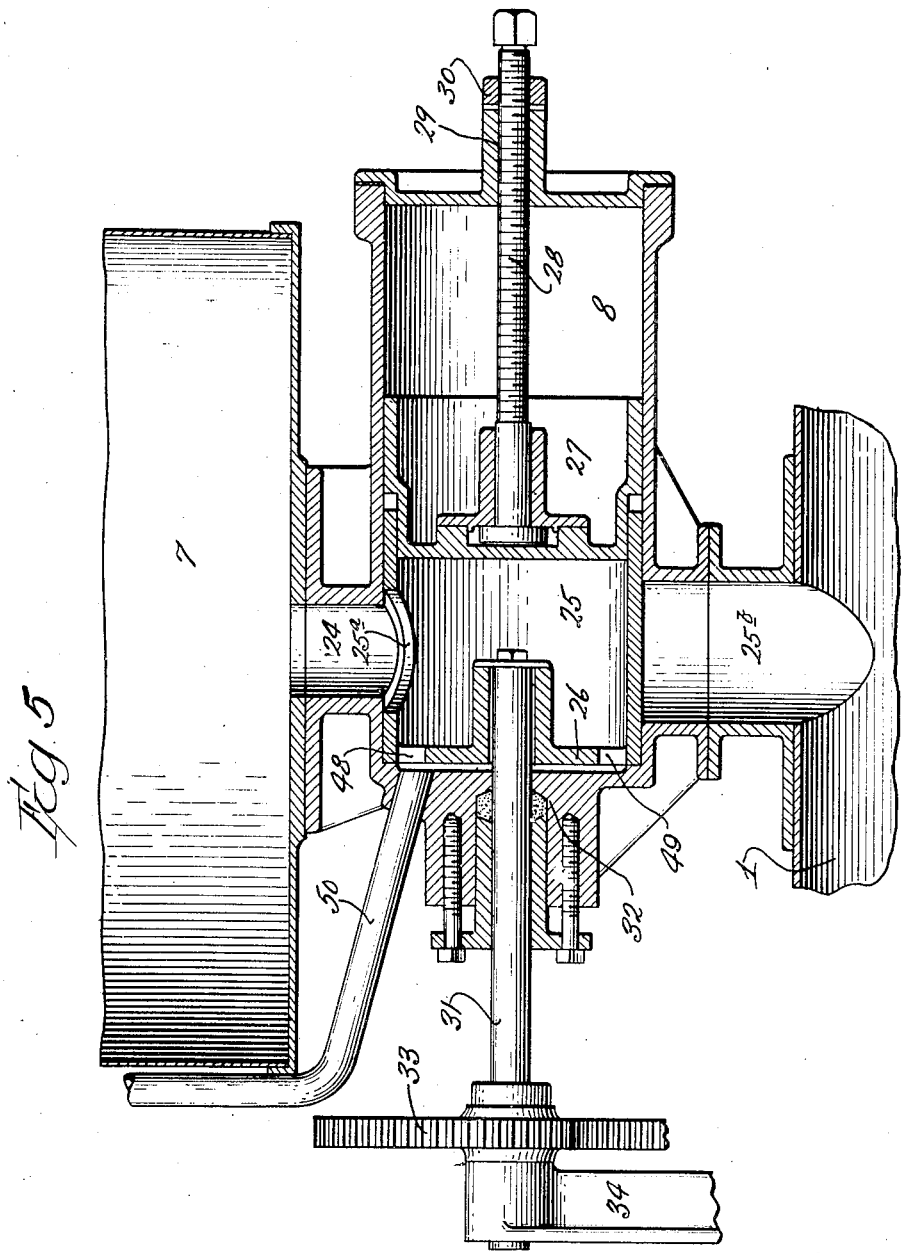

1,936,299

UNITED STATES PATENT OFFICE 1,936,299

APPARATUS FOR TREATING CORN FOR CANNING PURPOSES

Ignatius J. Goode, Chicago, Samuel M. Barraclough, Sterling, and John Schmidt, Hoopeston, Ill., assignors to Sprague-Sells Corporation, Hoopeston, Ill.

Application January 20, 1928. Serial No. 248,160

20 Claims. (Cl. 99—2)

This invention relates particularly to a new and improved method and apparatus for controlling the consistency and general character of green corn during the process of preparing it for canning purposes.

The load to load variation of green corn coming to the canning factory from the field is found to vary very much as to its age and development toward ripeness. This uncontrolled variation has heretofore caused more or less difficulty in the canning factory in getting and maintaining the proper and desired consistency in the mixture of corn and brine to give just the right texture to the product when it goes into the can and to maintain this desired condition throughout the day by day runs and throughout the season covering the corn canning period.

There have been two general methods in practice for controlling the consistency of the mass during preparation. Both of these methods have depended upon the judgment of an operator, principally through visual examination of the mixture of corn and brine to get the desired consistency in the finished product, or by measuring a predetermined quantity of corn and adding a predetermined quantity of brine or syrup. Neither of these methods were at all satisfactory on account of the difficulty of judging the ripeness of the corn after it has been cut from the cob and mixed or crushed before or at the time of adding the brine.

Young corn with the natural starch less developed will absorb far less brine in creaming up than will older corn that has the natural starch more fully developed, also the younger corn is more bulky and gives less weight per cubic foot than the more developed corn, and since these differing grades are mixed in varying degrees in the green corn as it comes from the field there has been no satisfactory way of controlling the desired consistency with the desired certainty, so that the finished product of an entire pack covering some weeks would all be of the desired consistency to command the best prices.

Applicants have discovered that there is a distinct relationship between the actual weight of the cut corn, (not its volume), and its age. The result of this discovery has been the development of the method and apparatus of this application wherein a predetermined weight of cut corn is segregated from a mass and a predetermined measure of brine or syrup is added. This manner of weighing the corn and measuring the brine has been found to give very accurate results in controlling the day to day and load to load variation of corn as it is brought in from the field, and in one plant the entire season was run with only one correction or adjustment of the apparatus to compensate for an extreme variation that the apparatus could not care for, and this adjustment occurred on the last day of the pack when some very immature corn was run through than would ordinarily have been handled, in order to save it from an expected frost.

It is therefore a principal object of the invention to provide a method for preparing green corn for canning purposes wherein the natural variation existing in corn as it comes from the field, due to its state of ripeness, is compensated for by weighing predetermined quantities of corn and mixing with predetermined measures of brine or syrup to give and maintain the desired consistency in the finished product.

It is also a principal object of the invention to provide apparatus that will automatically segregate a predetermined weight of green corn from a mass and automatically measure a predetermined quantity of brine or syrup from a mass and mix the two quantities to maintain the desired consistency in the finished product.

It is also an object of the invention to provide an apparatus that may be adjusted from time to time if the condition of the incoming corn demands it, to thereby maintain the desired consistency and general character of the finished product.

It is also an object of the invention to provide a complete operating unit comprising a tank and measuring apparatus for measuring a predetermined quantity of brine or syrup; a tank and weighing apparatus that will weigh a predetermined quantity of corn; means for discharging both the measured brine and the weighed corn into a general mixing tank where they are mixed and heat treated.

It is also an object of the invention to provide means operable from the weight of the charge of corn to set into motion the mechanism for discharging the desired quantity of brine necessary for that particular charge of corn.

It is also an object of the invention to provide automatic means for resetting the mechanism that controls the measuring and discharging of the brine or syrup.

It is also an object of the invention to provide means for easily regulating the weight of the charge of corn.

It is also an object of the invention to provide means for easily regulating the measure of brine or syrup independent of the regulating means controlling the weight of corn.

With such objects in view as well as other advantages inherent in the invention, the novel structural peculiarities, novel organization of elements, and the separate and collective operations involved in carrying out the recited objects of the invention, which will be made the subject matter of claims hereto appended, we wish it understood that the several necessary elements constituting the same may be varied in their proportion, placement and general operative relation without departing from the scope and nature of the invention.

In carrying out the objects of our invention in a concrete form or machine, other objects and advantages and improvements have been evolved than have been recited, and in order to make the invention more clearly understood there are shown in the accompanying drawings, in a somewhat diagrammatic form, means and mechanism embodying the preferred structural arrangement and the preferred disposition of the different parts and combinations, in which we have simply illustrated one way of embodying the creative part or concept of the invention in a concrete form of machine. The described devices are simply embodiments of the invention which other structures might also employ and some of the parts and combinations of parts may be used without the others in different types of such machines without departure from the purview of our invention and we regard ourselves as entitled to such variations from the shown and described devices as fall within the scope and meaning of the claims.

Referring now to the drawings accompanying this application a clearer and better understanding of the invention will be had, in which:

Fig. 1 is a side elevation of a machine embodying the invention. This view clearly illustrates the relation of the weighing mechanism to the trip mechanism that controls the discharge of the brine or syrup; it shows in dotted lines the interior arrangement of the mixer blades in the mixer tank and shows the means for regulating the weight of corn desired in each charge.

Fig. 2 is a plan of the apparatus shown in Fig. 1 showing clearly the relative positions of the weighing device; the brine tank and the mixer tank on which the various elements are mounted.

Fig. 3 is an end elevation looking from the left of Fig. 1 and clearly shows the general arrangement of the mechanism for operating the various elements of the apparatus, and also more clearly than the other views the relative positions of the different mechanisms and their interconnections.

Fig. 4 is an enlarged view of the gearing and trip mechanism of Fig. 3 and is reversed from this view to more clearly show the relation of the various parts and may properly be termed a sectional elevation taken on approximately the line 4—4 of Fig. 1.

Fig. 5 is a sectional elevation through the brine tank and measuring mechanism and is taken on approximately line 5 of Fig. 3.

No specific details of the weighing device have been shown because we have adopted for this part of our invention a well known apparatus that is not our invention per se, except in so far as it combines with other elements to produce our complete invention.

A general description of our invention comprises a mixing tank mounted in substantially a horizontal position, mounted side by side on the top of this tank is the weighing and brine measuring devices, on the front end of the tank is mounted the interconnecting mechanism that controls the operation of the various devices in synchronism and on the opposite end of the tank is mounted the drive means for operating the entire apparatus.

1 represents the mixer tank, 2 represents the main drive shaft extending entirely through the tank from end to end and carrying on one end the drive pulley 3 and clutch 4, and on the other end the main drive gear 5. 6 represents the weighing device intact, 7 represents the brine tank, 8 represents the brine measuring apparatus and 9 represents the heat control and piping for the mixer tank 1.

The weighing apparatus comprises the drum 6 pivoted at 10 to a weighted arm 11 carrying the movable weight 12 and finding fulcrum in the slotted bracket 13. The center of the drum carries a boss on each side as at 14 engaging the slotted ends of the forked member 15, which in turn is pivoted at 16 to a fixed standard and carries on its opposite end the pitman 17 which at its lower end engages with the rock lever 18 pivoted to the fixed member 19 and connected on its other end with the link 20 connected in turn with the rocking trip dog 21.

Just briefly describing the interior of the weighing drum 6. In dotted lines I have indicated a swinging partition member 6a and one discharge door in the bottom 6b, the operation of these parts will be referred to in more detail in the operative description of the invention.

The weighing apparatus is mounted on a base member 22 that finds bearing on a built out member 23 forming a part of the mixer tank 1 and forming a closed path for the discharge of the weighed mass of corn from the weighing drum 6 into the mixer tank 1.

The brine or syrup tank 7 is directly mounted on the measuring device 8. A port 24, Fig. 5 provides passage of the syrup from the tank into the measuring chamber 25. The measuring device comprises the rotary measuring element 26 which rotates in a fixed position in one end of the member 8. Located intermediate of the member 8 and overlapping the end of the measuring member 26 is an adjustable stop member 27. The adjustment of the member 27 is through the medium of the screw 28 moving in the head 29 and secured in adjustment by the lock nut 30. By adjusting the stop member 27 the cubical contents of the chamber 25 may be made larger or smaller as conditions may require. A stub shaft 31 extends through a stuffing box 32, the inner end is secured to the member 26 and the outer end carries the eccentric gear 33, this end of the shaft being supported in the fixed bracket 34. The eccentric gear 33 meshes with a companion eccentric gear 35 carried by the shaft 36. The function of these eccentric gears will be fully described in the operative description.

On the main drive shaft 2 is the previously referred to gear 5, this gear meshes with the gear 37 which in turn meshes with the clutch gear 38 carried by the shaft 36. This gear train has continuous motion, the clutch gear 38 running loose on the shaft 36 and imparting motion to that shaft only when the mechanism is tripped to operate the syrup measuring device. Also loosely mounted on the shaft 36 is the cam member 39 carrying the trip finger 40 which normally rests inactive with its end engaging the trip dog 21 and held securely thereon by the tension spring 41. The gear 38 carries a friction drum and clutch indicated at 42, the clutch being operated by the arm 43 in the well known manner of friction clutches of this general type. The free end of the clutch arm 43 carries a roller riding on the cam 39 indicated at 44, and another roller 45 whose function is to automatically return the trip finger 40 to the position shown in full lines after it has been tripped by the weighing device as will be fully described in the operative description. As a part of this clutch and control mechanism the arm 46 and spring 47 come into play.

Operation

The following descriptive operation of our invention will be as follows when embodied in an apparatus substantially as we have shown, but may differ quite materially if applied to differently arranged mechanism.

To start the machine in operation the syrup tank 7 would be filled with a suitable syrup or brine; cut corn having the desired previous treatment is supplied to the hopper of the weighing drum 6 by any suitable means, preferably in a continuous stream by any suitable conveyor. The corn will continue to fall into the drum 6 until a sufficient quantity has been deposited to overcome the weight 12 when the drum will be depressed causing the swinging partition 6a to move into its opposite position thus directing the incoming stream of corn to pass into the other section of the weighing drum. The movement of the swinging partition 6a also brings into motion the trap door 6b which releases the weighed charge of corn and it passes directly into the mixing tank 1. As has previously been stated the weighing mechanism per se referring particularly to that part operating the members 6a and 6b are not a part of our invention other than in the combination in which we use it, therefor a further description of this particular mechanism need not be given.

When the drum 6 is depressed by the charge of corn it also moves the forked arm 15 downward which in turn moves all of the chain of connections to the trip dog 21, moving this dog on its pivot and releasing the arm or finger 40, which under the impetus of the spring 41 moves quickly to the dotted position of Fig. 4, carrying with it the cam 39 which thereby receives a partial rotation on the shaft 36 raising the roller 44 out of the depression 39a, thus raising the arm 43 and bringing the friction clutch into action and giving the shaft 36 one complete revolution. The trip finger 40 moves to the dotted position and rests against the roller on the end of the lever 46. As soon as the clutch engages, the clutch arm 43 moves with it and follows the gear 38 in the direction of the arrow a. As the gear and arm 43 revolve the roller 45 on the extreme end of the clutch arm 43 engages the roller on the end of the arm 46 and moves the trip finger back into its normal position into engagement with the trip dog 21 where it is held until again tripped with another charge of corn in the drum 6. The replacement of the trip finger 40 brings the cam 39 back to its normal position as shown in Fig. 4 with the depression 39a in position to receive the roller 44 when it comes around and thus release the clutch by letting the roller drop into the depression and thus remove the tension on the friction clutch which has the effect of setting the mechanism for another cycle. As soon as the finger 40 is engaged over the trip dog 21 the roller 45 passes out of engagement with the roller on the end of the arm 46 and the spring 47 returns the arm 46 to the position of Fig. 4.

While the charge of corn is filling into the drum 6 a measured charge of syrup or brine is filling into the measuring compartment 25 from the brine tank 7 through the port 24, see Fig. 5. The port 25a in the member 26 is always in register with the port 24 when the mechanism is in the full line position of Fig. 4 and Fig. 3, and the eccentric gears 33 and 35 are in the position of Fig. 3 when the measuring cylinder 25 is in the position of Fig. 5. As soon as the trip finger is released and the shaft 36 is started into motion the eccentric gears 33 and 35 begin to revolve and thereby begin to rotate the measuring cylinder 25, moving the port 25a around a complete revolution and positioning it again in the position of Fig. 5. During the revolution of the chamber 25 by means of the eccentric gears 33 and 35 there is a period of its revolution that the port 25a is registering with the opening 25b entering into the mixing chamber 1. During the period of this registration the syrup will flow from the measuring chamber 25 into the mixing chamber through the open ports, and in order to give the liquid a maximum time in which to flow out of the chamber 25 the eccentric gear 33 is moving through its slowest period of revolution. In order to facilitate the entry of the syrup into and out of the measuring chamber 25 a vent pipe is provided as at 50 for venting the cylinder by registering in turn with the vent ports 48 and 49, the port 49 being long enough to vent the measuring chamber during the entire time the port 25a is passing the port 25b.

At the beginning of the run the operator will determine through experiment or previous judgment the desired consistency of the mixture of corn and syrup desired for the pack, and will adjust the weight 12 and the plunger 27 to give the desired measure of syrup and weight of corn. If he finds he is getting too much or not enough syrup for the weight of corn coming through he will either adjust the weight member 12 in or out on the weight arm 11 or he will change the charge of syrup by adjusting the plunger 27 in or out as the conditions may require.

The eccentric gear 35 being secured to the shaft 36, which is non-rotative except when the trip finger 40 is released, holds the eccentric gear 33 in its normal position of Fig. 3 and this gear being secured to the shaft 31 holds the measuring chamber normally inactive with the ports 24 and 25a in register until moved out of register through release of the trip finger 40.

When the weighed and measured charges of corn and syrup meet in the mixing chamber they are mixed and agitated in the presence of heat by means of the beater blades shown in dotted lines in Fig. 1 and the heat regulating device 9 and the heat pipes connected therewith and entering the mixing chamber 1. The mixed mass may be removed in any suitable manner through an opening that is normally closed by the plate 51.

What we claim as new and desire to secure by Letters Patent is:

1. An apparatus for treating green corn for canning purposes comprising a tank for containing a supply of liquid, an adjustable measuring device in operative relation to said tank for measuring predetermined fixed quantities of liquid, a container for receiving a charge of variable corn, means permitting said container to move from its normal position upon receiving a predetermined weight of corn, mechanism released by the movement of said container for effecting the discharge of the said measured unit of liquid and said unit of weighed corn, means for receiving the said separated units and means for mixing the said units into a mass of uniform consistency, with continuously moving means for operating the mechanism set into operation by the movement of said container.

2. An apparatus for treating green corn for canning purposes comprising a complete operative unit having a tank for supplying a suitable liquid, a measuring device in contact with said tank to isolate a measured quantity of liquid, a weighing device for receiving a charge of variable green corn, means operable by the movement of said weighing device after the charge is weighed for effecting the discharge of said measured liquid and said weighed charge of corn, a single means for receiving the said charges of liquid and corn, an agitating device within said receiving means for mixing the said charges and means for applying heat to the mass while it is being mixed with intermittent and continuously rotary means coacting to effect the discharge of liquid and corn.

3. An apparatus for treating green corn comprising a complete operative unit having a tank for a supply of a suitable liquid, a measuring device comprising a rotary element located adjacent said tank, a container for corn mounted for pivotal movement and adapted to operate under the impetus of a predetermined weight of corn, means set into motion by the said corn container when it moves under the predetermined weight for causing a discharge of the said measured quantity of liquid and the weighed quantity of corn, a container for receiving the said charges of liquid and corn, moving means within said container for agitating the said mass and forming the same into a uniform consistency and means for applying heat during the agitation, with intermittent and continuously moving means for effecting the said discharge of liquid and corn.

4. An apparatus for preparing cut green corn for canning purposes comprising instrumentalities for weighing charges of corn from a mass of corn varying in degree of ripeness, and measuring predetermined charges of a brine, continuous and intermittent rotary interconnecting means between said weighing and measuring means whereby the weighed charge of corn will effect the discharge of the measured charge of brine with means for receiving said charges and mixing them to a uniform consistency.

5. An apparatus for preparing cut green corn for canning purposes comprising means for weighing charges of corn, other means for measuring charges of a brine, continuous and intermittent rotary interconnecting means operatively connecting said weighing and said measuring means whereby the movement of the weighing device will effect movement of the measuring device to discharge the weighed and measured charges into a common receptacle with means in said receptacle for then agitating and mixing said charges.

6. An apparatus for preparing cut green corn for canning purposes comprising a balancing receptacle for receiving a charge of corn, an associated receptacle for containing a suitable brine, a rotary measuring device operatively connected with said brine receptacle, continuous and intermittent rotary interconnecting instrumentalities whereby when said corn receptacle is moved by a weighed charge of corn and begins discharge of the weighed charge received it operates said interconnecting instrumentalities to effect a discharge of measured brine, an associated receptacle for receiving said charges of corn and brine with means therein for agitating and mixing said charges.

7. An apparatus for measuring and weighing a fluent material and a granular material, means in operative connection with said fluent material for receiving a charge therefrom with means for operating said means at varying speeds during the discharge thereof, a balancing means for receiving a stream of granular material and being moved thereby when a predetermined weight of material is present, interconnecting means whereby when said granular material moves said balancing means the said fluent material discharge means is also set into movement to discharge the charge of fluent material, with other associated means for receiving said charges and mixing the same.

8. An apparatus for preparing cut green corn for canning comprising a unitary device including a tank for liquid and a measuring device associated therewith, a balancing receptacle for cut corn, and a mixing chamber for receiving corn and liquid and mixing them, a train of gearing connecting said liquid tank and said mixing chamber, and devices connecting said gearing with said balancing receptacle whereby a weighed charge of corn will affect said devices and cause a measured charge of liquid to pass into said mixing tank with a weighed charge of corn from said balancing receptacle, with means for resetting said mechanism for another cycle of operation.

9. An apparatus for preparing cut green corn for canning comprising a unitary device including a tank for liquid, a rotary measuring device connected therewith, a balancing receptacle for receiving cut green corn and discharging weighed charges therefrom, a mixing chamber for receiving charges of liquid and corn and mixing them, a gear train connecting said mixing tank and said liquid measuring device and having continuous motion, devices connecting said balancing receptacle with said gear train whereby a weighed charge of corn will act to bring said devices into operative relation with said gear train to cause a discharge of measured liquid each time a weighed charge of corn passes through said balancing receptacle.

10. An apparatus for preparing cut green corn for canning purposes comprising a unitary device including a tank for liquid, a rotary measuring device associated therewith, means for imparting a variable discharging speed to said measuring device, a balancing receptacle for weighing charges of corn, a mixing chamber connected with said liquid tank and said balancing receptacle and having means for receiving charges of liquid and corn from said devices, a continuous moving gear train, a clutch controlled by said balancing receptacle whereby a weighed charge of corn will release mechanism to connect said clutch with said gear train and effect a feeding of a measured charge of liquid each time a weighed charge of corn is released, both of said charges passing into said mixing chamber.

11. An apparatus for weighing a charge of corn that varies in bulk according to its degree of ripeness, measuring a charge of liquid that is substantially constant with the weighed charges of corn, rotary means released by a weighed charge of corn for discharging a measured charge of liquid, interconnecting mechanism between the weighing device and the liquid measuring device for controlling the operation of one by the other, said mechanism including a clutch for effecting the discharge of the liquid and an intermittently operating gear train moved by said clutch when released by said weighing device.

12. An apparatus for weighing a charge of green corn that varies in bulk according to its degree of ripeness, measuring a charge of liquid that remains substantially constant with the weighed charges of corn in which the bulk varies, a continuous rotary means serving as a constant source of power, an intermittent rotary means associated with said continuous rotary means for effecting the release of a measured charge of liquid, a train of gearing associated with said intermittently rotatable means and a clutch for connecting said train of gearing with said intermittent rotary means, the said mechanism being controlled by the movement of a weighed charge of corn.

13. An apparatus for weighing a charge of green corn that varies in bulk according to the degree of ripeness, measuring a charge of liquid that remains substantially constant with the charges of corn in which the bulk varies, a continuous rotary means serving as a source of power, a mixing device direct connected to said continuously rotating means and deriving continuous movement therefrom, a clutch and gearing subject to intermittent rotation and capable of operative connection with said continuously rotating means, a releasing device controlled by the corn weighing device and operative thereby to connect the said intermittent and continuous rotary means whereby the discharge of a charge of liquid is effected.

14. An apparatus for weighing charges of green corn wherein each weighed charge may vary in bulk according to its degree of ripeness, measuring charges of liquid that will remain substantially constant in bulk, a continuous rotary means serving as a source of power, a mixing device direct connected to said source of power and deriving continuous movement therefrom, a variable speed gear train controlling the discharge of said measuring device, with means operable from the weighing device for setting said gear train in motion to discharge a charge of liquid.

15. An apparatus for weighing charges of green corn wherein each weighed charge may vary in bulk according to its degree of ripeness, measuring charges of liquid that are substantially constant in bulk, a mixing device to receive at each cycle of operation of said measuring and weighing devices charges of material therefrom, co-acting interconnecting gear means for imparting discharging movement to said measuring device and releasing and locking means controlled by the weighed charge of corn for setting said gear means in motion.

16. An apparatus for weighing charges of green corn and measuring charges of liquid, a mixing tank for receiving said charges and mixing them, said measuring device comprising a rotary measuring cylinder, means for imparting a variable speed of rotation to said cylinder whereby it moves at reduced speed during the discharge of liquid and stands at rest during the time of filling with disconnecting means for giving the period of rest.

17. An apparatus for weighing charges of corn and measuring charges of liquid, a mixing tank for receiving said charges in succession, the measuring device comprising a rotary cylinder an adjustable head closing one end of said cylinder whereby to vary the charge of liquid measured thereby, means for imparting variable speed of rotation to said cylinder so that it discharges at reduced speed and means for imparting a period of rest to said cylinder during the filling time.

18. An apparatus for weighing charges of material and measuring charges of another material, the weighing device comprising a hopper that overbalances when a predetermined charge of material is delivered thereto, oscillatable means connected with said hopper, a release device included in said oscillatable means, said devices receiving movement when said hopper overbalances, intermittent rotatable means controlled by said release means and having operative connection with said measuring device whereby a measured charge of material is discharged when said intermittent means is released for rotation.

19. In an apparatus for preparing cut green corn for canning, a weighing device for receiving cut corn and operating to discharge its contents upon the accumulation therein of a predetermined weight of corn, a liquid containing receptacle, a measuring device communicating therewith and operable to isolate and discharge constant predetermined volumes of liquid from said receptacle irrespective of variation in the density of said liquid, means interconnecting said weighing and measuring devices to actuate said measuring device due to discharge of the weighing device, and a mixing tank for receiving the discharge from said weighing and measuring devices.

20. An apparatus for preparing cut green corn for canning purposes consisting in mixing the corn and a brine of proper density to form a cream like consistency of product, comprising mechanism for receiving cut green corn and weighing successive charges thereof, other mechanism for measuring constant successive volumes of a brine irrespective of variations in density of said brine, associated mechanism set into operation by a weighed charge of corn for actuating said measuring mechanism to discharge said predetermined volume of brine and a mixing receptacle for receiving said discharges of weighed corn and volume of brine and mixing them to the desired consistency.

IGNATIUS J. GOODE.
SAMUEL M. BARRACLOUGH.
JOHN SCHMIDT.